United States Patent
Pearson et al.

(10) Patent No.: US 10,638,082 B2
(45) Date of Patent: Apr. 28, 2020

(54) SYSTEMS AND METHODS FOR PICTURE-IN-PICTURE VIDEO CONFERENCE FUNCTIONALITY

(71) Applicant: Gregory A. Pearson, Inc., Dunedin, FL (US)

(72) Inventors: Gregory A. Pearson, Dunedin, FL (US); David B. Hall, New Port Richey, FL (US)

( * ) Notice: Subject to any disclaimer, the term of this patent is extended or adjusted under 35 U.S.C. 154(b) by 0 days.

(21) Appl. No.: 14/472,244

(22) Filed: Aug. 28, 2014

(65) Prior Publication Data

US 2016/0065880 A1 Mar. 3, 2016

(51) Int. Cl.
| | |
|---|---|
| *H04N 5/45* | (2011.01) |
| *H04N 7/15* | (2006.01) |
| *H04N 5/445* | (2011.01) |
| *H04N 21/431* | (2011.01) |
| *H04N 21/2665* | (2011.01) |

(Continued)

(52) U.S. Cl.
CPC ........... *H04N 5/45* (2013.01); *H04N 5/44591* (2013.01); *H04N 7/147* (2013.01); *H04N 7/15* (2013.01); *H04N 7/155* (2013.01); *H04N 21/2187* (2013.01); *H04N 21/231* (2013.01); *H04N 21/234363* (2013.01); *H04N 21/2665* (2013.01); *H04N 21/4316* (2013.01); *H04N 21/6582* (2013.01); *H04N 21/854* (2013.01)

(58) Field of Classification Search
USPC ......................................... 434/350; 704/235
See application file for complete search history.

(56) References Cited

U.S. PATENT DOCUMENTS

| | | | |
|---|---|---|---|
| 7,580,080 B2 * | 8/2009 | Anderson | H04N 5/45 348/565 |
| 8,739,234 B1 * | 5/2014 | Cheung | H04N 21/25841 725/29 |

(Continued)

FOREIGN PATENT DOCUMENTS

JP      2015125411 A  *  7/2015 ....... H04N 21/44004

OTHER PUBLICATIONS

JP2015125411, Ishii Atsushi, Jul. 2015, pp. 1-50, Translation of Japanese reference. (Year: 2015).*

(Continued)

*Primary Examiner* — Duc Nguyen
*Assistant Examiner* — Assad Mohammed (57) ABSTRACT

Techniques for dynamically providing a picture-in-picture display incorporating live video content from a first network device, and pre-recorded content from a second network device, in a single stream. In an example scenario, a host or presenter may record a live video of himself or herself answering questions for an online audience. Before or during recording of the live video content, an audience member may record a video of himself asking a question directed to the host. A server may receive both the live video content and the pre-recorded video content, and may format or repackage the two sources of content for simultaneous viewing by the audience in real- or near real-time. To present this Q&A dynamic, some implementations may provide a picture-in-picture effect, wherein the display of a first content (e.g., the live video content) may be temporarily reduced to accommodate display of second content (e.g., the pre-recorded video content).

15 Claims, 6 Drawing Sheets

(51) Int. Cl.
    *H04N 21/658*     (2011.01)
    *H04N 21/231*     (2011.01)
    *H04N 21/2343*     (2011.01)
    *H04N 21/854*     (2011.01)
    *H04N 21/2187*     (2011.01)
    *H04N 7/14*     (2006.01)

(56) References Cited

U.S. PATENT DOCUMENTS

| | | | |
|---|---|---|---|
| 8,782,721 B1* | 7/2014 | Kellicker | H04N 21/234336 348/468 |
| 9,508,385 B2* | 11/2016 | Mondelore | G11B 27/10 |
| 2004/0236830 A1* | 11/2004 | Nelson et al. | 709/204 |
| 2006/0245736 A1* | 11/2006 | Affaki | H04N 5/45 386/235 |
| 2006/0248471 A1 | 11/2006 | Lindsay et al. | |
| 2007/0118868 A1* | 5/2007 | Zhang | H04N 7/181 725/105 |
| 2007/0250896 A1 | 10/2007 | Parker et al. | |
| 2011/0064387 A1* | 3/2011 | Mendeloff | H04N 5/4401 386/262 |
| 2011/0113166 A1* | 5/2011 | Hung | G06F 13/4027 710/63 |
| 2012/0092438 A1* | 4/2012 | Guzman Suarez | H04N 7/15 348/14.03 |
| 2012/0284646 A1* | 11/2012 | Sitrick | G06Q 10/10 715/753 |
| 2013/0139269 A1* | 5/2013 | Shaikh | H04L 63/10 726/26 |
| 2013/0151623 A1* | 6/2013 | Weiser | H04N 7/147 709/205 |
| 2013/0166580 A1* | 6/2013 | Maharajh | H04L 65/605 707/758 |
| 2013/0198196 A1* | 8/2013 | Myslinski | G06F 17/30023 707/740 |
| 2013/0321560 A1* | 12/2013 | Angelo, Sr. | H04N 7/152 348/14.03 |
| 2014/0046661 A1* | 2/2014 | Bruner | H04N 21/4884 704/235 |
| 2014/0072945 A1* | 3/2014 | Gu | G09B 5/12 434/350 |
| 2014/0129730 A1* | 5/2014 | Phillips | H04L 65/605 709/231 |
| 2014/0198252 A1 | 7/2014 | Pornprasitsakul et al. | |
| 2014/0208235 A1* | 7/2014 | Robinson | G06F 3/0481 715/753 |
| 2014/0229992 A1* | 8/2014 | Ellis | H04N 5/44543 725/47 |
| 2014/0317532 A1* | 10/2014 | Ma | H04N 7/152 715/753 |
| 2016/0044279 A1* | 2/2016 | Block | H04N 7/152 348/14.09 |

OTHER PUBLICATIONS

International Search Report and Written Opinion in related International Patent Application No. PCT/US15/47329, dated Dec. 4, 2015.

* cited by examiner

FIG. 5

SYSTEMS AND METHODS FOR PICTURE-IN-PICTURE VIDEO CONFERENCE FUNCTIONALITY

BACKGROUND

Video-over-IP technology utilizes video codecs to transform video content into a bitstream transportable as IP packets, thereby enabling live video content to be recorded and streamed to viewers over the Internet or another suitable network in real-time. Video-over-IP technology enables a host of exciting tools for communication and collaboration. However, video-over-IP networks, even more so than voice-over-IP networks, must meet stringent quality of service requirements to ensure an acceptable user experience. Moreover, the time-critical nature of video-over-IP packet assembly and delivery imposes additional engineering challenges compared to the manipulation and distribution of pre-recorded video content. Thus, the implementation of certain conventional video features, such as picture-in-picture display of multiple content streams from different sources, may be non-trivial to incorporate into video-over-IP applications.

SUMMARY

These challenges, and others, may be addressed by certain implementations of the disclosed technology. Certain implementations include techniques for dynamically providing a picture-in-picture display incorporating live video content from a first network device, and pre-recorded content from a second network device, in a single stream.

According to an example implementation, a method is provided. The method may include receiving streaming video data at a computing device, for example, a server. The streaming video data may represent live content recorded at and/or sent from a first network device. The method may further include outputting, by the computing device, the live content for display at a plurality of network devices. The method may yet further include receiving at the computing device, video data representing pre-recorded content from a second network device during the outputting of the live content by the computing device. The method may still yet further include outputting, by the computing device, for display at the plurality of network devices, the pre-recorded content while still outputting, for display, the live content. The display of the live content may be formatted from a first size to a second smaller size for inset into the display of the pre-recorded content to present a picture-in-picture effect. The method may also include stopping the outputting of the pre-recorded content while continuing the outputting of the live content, ending the picture-in-picture effect.

According to some example implementations, various systems are provided. Each system may include a computing device, and a memory operatively coupled to the computing device and configured for storing data and instructions that may be executed by the computing device. When executed, the respective system may be caused to perform a method substantially similar to the method described hereinabove.

According to additional example implementations, various computer program products are provided. Each computer program product may include or be embodied in a non-transitory computer readable medium. The respective computer readable medium may store instructions that, when executed by at least one processor in a system, cause the system to perform a method substantially similar to the method described hereinabove.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology include techniques for dynamically providing a picture-in-picture display incorporating live video content from a first network device, and pre-recorded content from a second network device, in a single stream.

In an example scenario, a host or presenter may record a live video of himself or herself answering questions for an online audience. Before or during recording of the live video content, an audience member may record a video of himself or herself asking a question directed to the host. A server, or other computing device, may receive both a first video content (e.g., the live video content) and second video content (e.g., the pre-recorded video content), and may format or repackage the two sources of content for simultaneous viewing by the audience in real- or near real-time, as a single live video stream. Additional content, such as captions, may also be added to the live video stream.

To present the above-described Q&A dynamic in a visually appealing and intuitive format, some implementations may provide a picture-in-picture effect, wherein the display of the live video content may be temporarily reduced to accommodate display of the pre-recorded video content. In an example implementation, the display of the live video content may be reduced to a picture-in-picture element, and overlaid or inset on a full-size display of the pre-recorded video question. Accordingly, the pre-recorded video content may be visually emphasized while the video question is being presented by the audience member. After display of the pre-recorded video question has ended, the display of the live video content may expand to its original size to shift the visual emphasis or focus back to the presenter as he or she prepares to deliver a response to the question.

In the following description, the disclosed technology is described primarily in regards to implementing a picture-in-picture effect to facilitate a Q&A session involving live video content from a host and pre-recorded video content from one or more viewers. However, the techniques disclosed herein may be applicable to other forms of collaborative video communications for a variety purposes and to the simultaneous presentation of multiple video content sources therein, whether live or pre-recorded. Accordingly, live content may be substituted for pre-recorded content and vice versa herein where appropriate.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for dynamically providing a picture-in-picture display incorporating live video content from a first network device, and pre-recorded content from a second network device, in a single stream and will now be described with reference to the accompanying figures.

Figure 1:
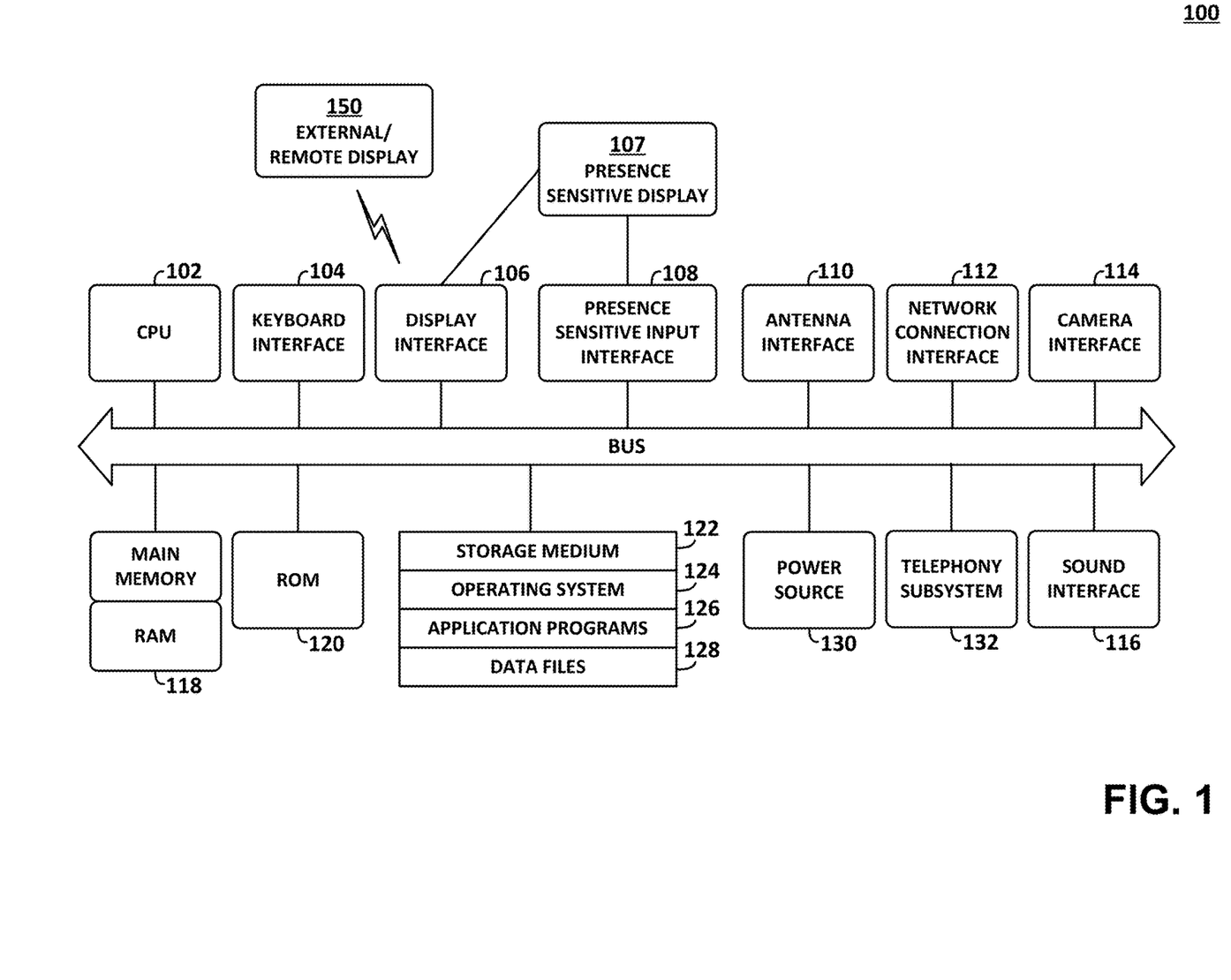
FIG. 1 depicts a block diagram of illustrative computing device architecture 100, according to an example implementation.

FIG. 1 depicts a block diagram of illustrative computing device architecture 100, according to an example implementation. Certain aspects of FIG. 1 may be embodied in a computing device (for example, a dedicated server computer or a mobile computing device). As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some implementations of the disclosed technology, the display interface 106 may be directly connected to a local display, such as a touch-screen display associated with a mobile computing device. In another example implementation, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain implementations, the display interface 106 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example implementation, the computing device architecture 100 may include a presence-sensitive display interface 107 for connecting to a presence-sensitive display. According to certain some implementations of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. According to certain implementations, a camera interface 114 is provided that acts as a communication interface and provides functions for capturing digital images from a camera or other image/video capture device. According to certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components. According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device may be coupled, connected, or in communication with one or more peripheral devices, such as display, camera, speaker, or microphone.

In some implementations of the disclosed technology, the computing device may include any number of hardware or software applications that are executed to facilitate any of the operations. In some implementations, one or more I/O interfaces may facilitate communication between the computing device and one or more input/output devices. For example, a universal serial bus port, a serial port, a disk drive, a CD-ROM drive, or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks or connections; for example, the connections that facilitate communication with any number of sensors associated with the system. The one or more network interfaces may further facilitate connection to one or more suitable networks; for example, a local area network, a wide area network, the Internet, a cellular network, a radio-frequency network, a Bluetooth-enabled network, a Wi-Fi-enabled network, a satellite-based network, any wired network, any wireless network, etc., for communication with external devices or systems.

Example Communications Systems

Figure 2:
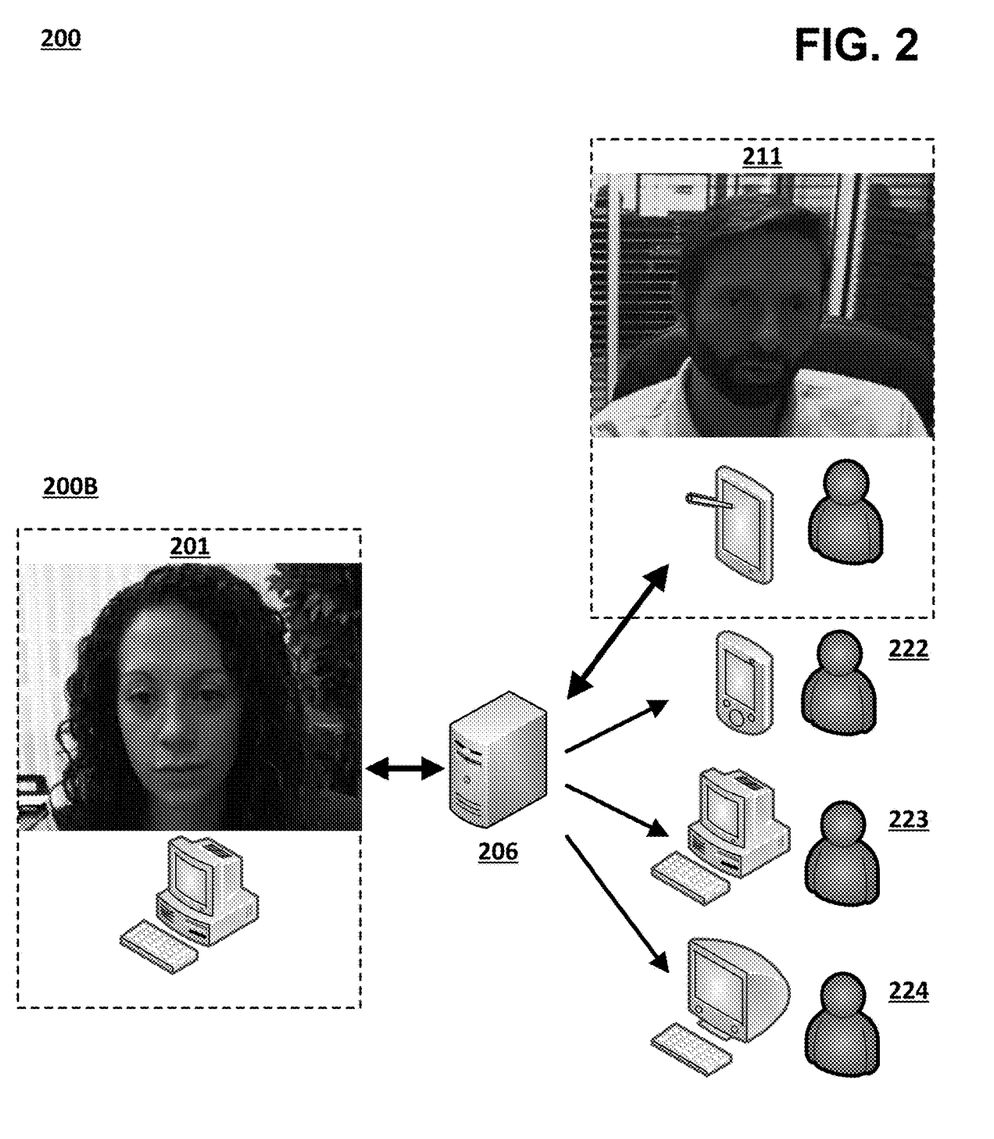
FIG. 2 depicts a schematic diagram 200 of a system for dynamically providing a picture-in-picture display incorporating live video content from a first network device, and pre-recorded content from a second network device, in a single stream, according to an example implementation.

FIG. 2 depicts a schematic diagram 200 of a system for dynamically providing a picture-in-picture display incorporating live video content from a first network device, and pre-recorded content from a second network device, in a single stream, according to an example implementation. As shown in FIG. 2, network communications may be conducted between a first user 201 and a plurality of other users 211 222 223 224. The first user may be a primary user, for example a host or presenter. The plurality of other users may be secondary users, for example, viewers or audience members. The first user may engage in communications through a first network device, and the plurality of other users through their own respective network devices. In some implementations, one or more network devices may be, comprise, or correspond to a respective computing device or image capture device. In some implementations, the respective computing device may be associated with one or more portions of the computer architecture illustrated in FIG. 1.

The network devices may be connected by or through a network, such as the Internet or a local area network (LAN). In some implementations, a server device 206 or other intermediary may facilitate communications transmitted between the first and second network devices. For example and not limitation, the server device may host or support a video communications service. The first user 201 may initiate a video session with the second user 211 by engaging the video communications service. One of skill in the art will recognize that the server device may be one or more computing devices and associated infrastructure (e.g., a network). In some implementations, the server device may be or include a dedicated physical server. In another implementation, the server device may be a virtual server, for example, that is hosted on a cloud-computing platform.

The server device 206 may provide various levels of support facilitating communications between the network devices. In some implementations, many or all communications between the first network device and the plurality of other network devices may be routed through the server device 206. Thus, video data may be routed through or modified at the server device. In another implementation, the server device may at least partially manage communication between the network devices; however, the video data may not pass through the server. Instead, a first network device may direct data directly to a second network device and vice versa. Accordingly, at least a portion of the modification of the live video content data may occur at one or more of the first or second network devices. In some such implementations, management of communications between the network devices may occur at the network devices without the involvement of a server device or other intermediary.

According to certain implementations, the first user 201 may engage in a video session with a plurality of other users 211 222 223 224. Accordingly, live video content recorded by an image capture device associated with a first network device may be sent as part of a live video stream to the network devices associated with the plurality of other users. The other users may receive and view the live video stream at a display associated with their respective network devices.

In some implementations, the live video content may be modified before viewing by the other users as part of the live video stream. For example, the content, or live video stream itself, may be compressed, reformatted, or repackaged. Various video effects may be applied to the content or live video stream, such the picture-in-picture effect described herein.

Figure 3:
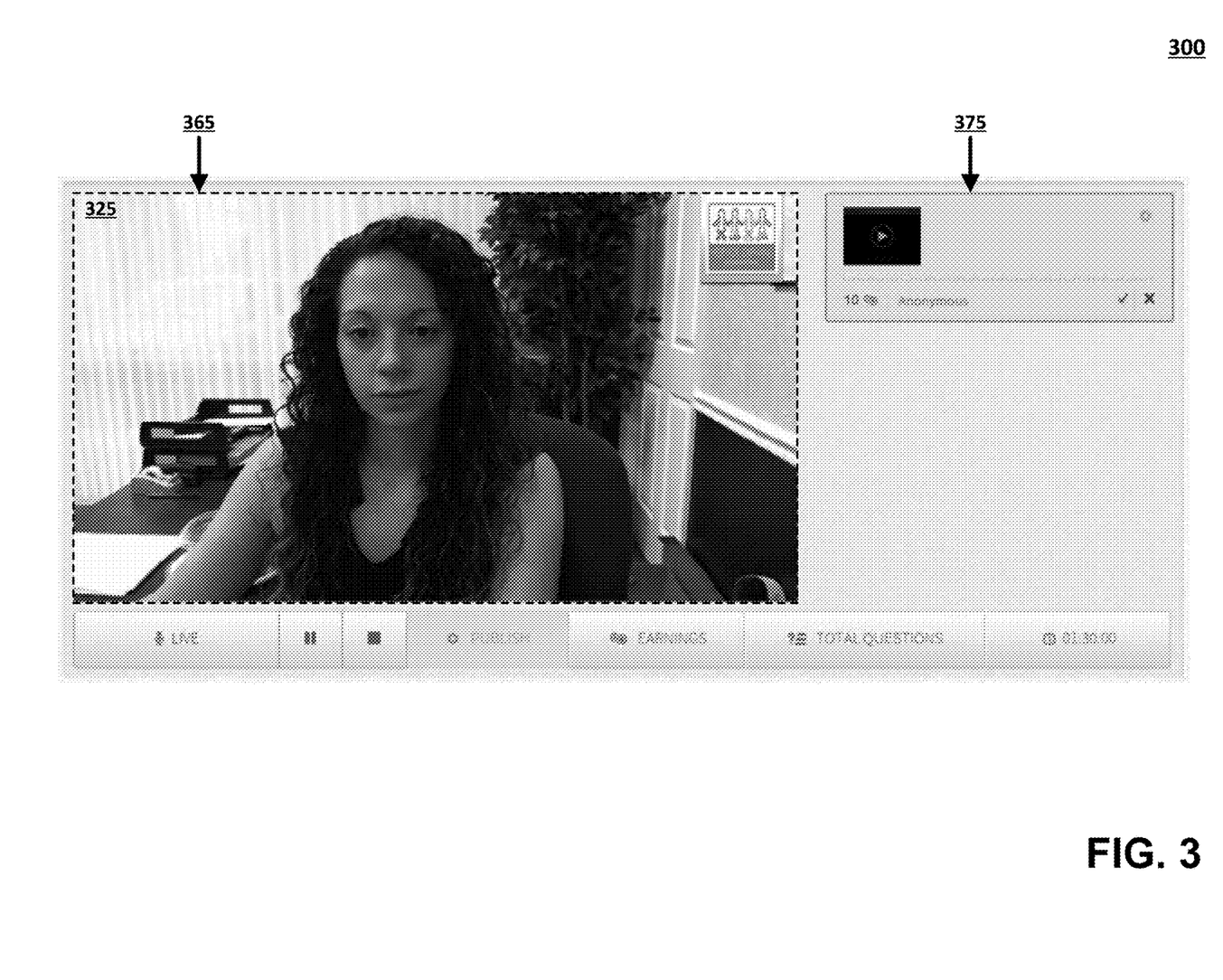
FIG. 3 depicts a display 300 of a video stream including live video content 325, according to an example implementation.

FIG. 3 depicts a display 300 of a video stream including live video content 325, according to an example implementation. In this example, the live video content is being recorded at a first network device by a first user 201. The first user is shown live answering a question from a queue of questions 375 submitted by audience members. As shown in FIG. 3, the video stream may be displayed in a content window 365 of a video communications application. In a first instance, the live video content may span the full content window, or otherwise be visually emphasized.

According to certain implementations, a video question may be recorded by a second user 211 of the plurality of other users that is directed to the first user 201. In some implementations, the video question may be recorded before the video session with the first user begins. In another implementation, the video question may be recorded during the video session. The pre-recorded video question may be submitted to be answered by the first user 201 from a network device of the second user.

According to certain implementations, the live video content and video question may be both received at an intermediate computing device, e.g., server device 206. The server device may process and combine the live content and pre-recorded content into a single video stream for display at the network devices. Accordingly, indications of both the live video content and pre-recorded content may be displayed in the content window 365 of a client video communications application. In some implementations, the server device 206 may combine the live video content and pre-recorded video content in real- or near-real time. However, in some implementations, display of the live video content may be intentionally delayed, for example, by imposing a broadcast delay. Such a delay may provide time to edit out or prevent the sharing of offensive content.

Figure 4:
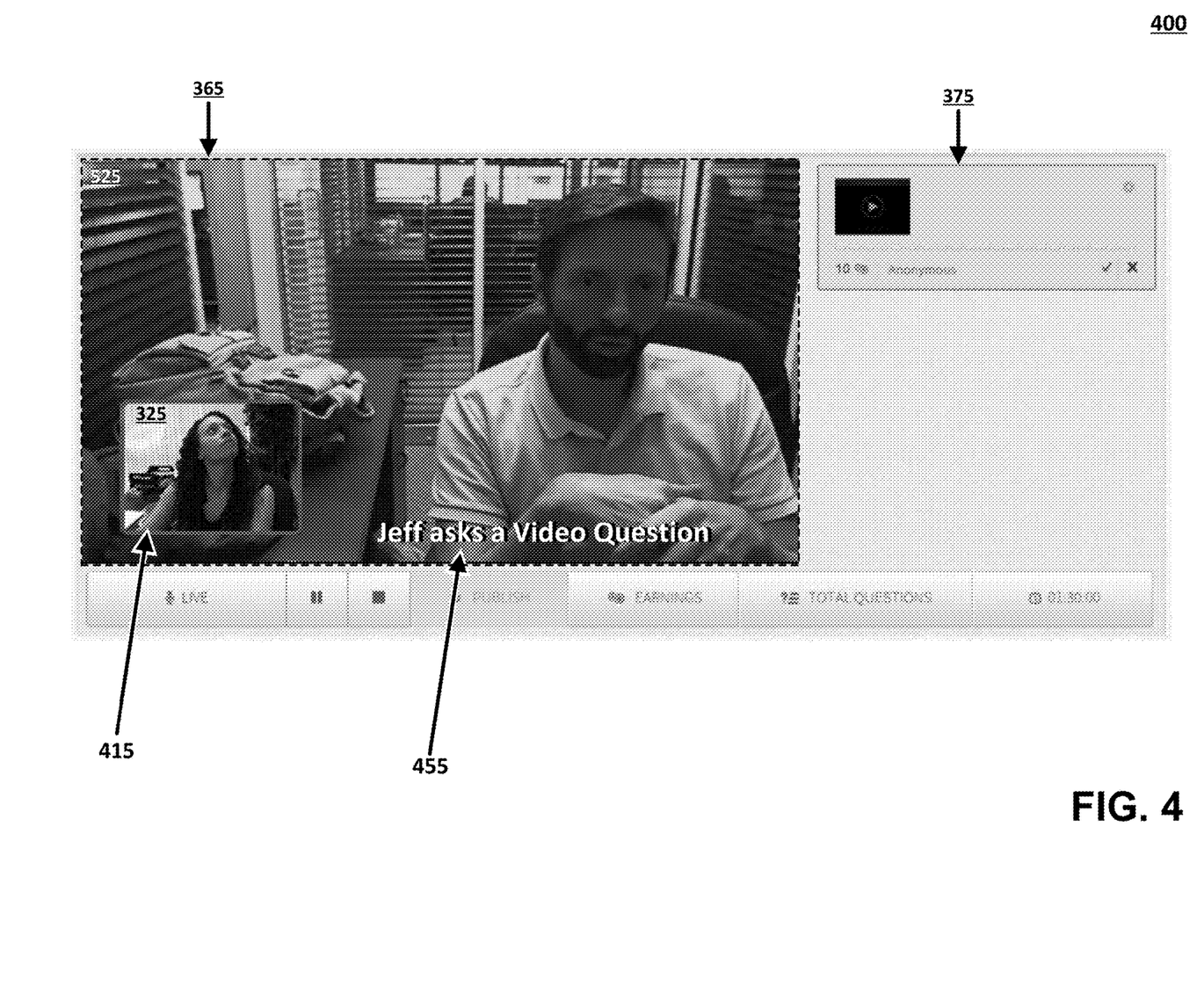
FIG. 4 depicts a display 400 of a video stream including live video content 325 inset or overlaid on pre-recorded video content 525 to create a picture-in-picture effect, according to an example implementation.

FIG. 4 depicts a display 400 of a video stream including live video content 325 inset or overlaid on pre-recorded video content 525 to create a picture-in-picture effect, according to an example implementation. To present the above-described Q&A dynamic in an appealing and intuitive format, some implementations may provide a picture-inpicture effect, wherein the display of the live video content may be temporarily reduced to accommodate display of the pre-recorded video question.

For example, as shown in FIG. 4, the display of the live video content 325 may be reduced to a picture-in-picture element 415 smaller than the full size of the content window 365. In some implementations, this display of the live video content may be overlaid or inset on a full-size display of the pre-recorded video question. Accordingly, the pre-recorded video content 525 may be visually emphasized while the question is presented by the audience member. In some implementations, after display of the pre-recorded video question has ended, the display of the live video stream may expand to its original size to shift the visual emphasis or focus back to the presenter as he or she prepares to deliver a response to the question. In another implementation, the visual emphasis may stay with the live video content during presentation of the video question and the pre-recorded content may be displayed in the picture-in-picture element.

In some implementations, display of pre-recorded video content 525 may end once the video question has been presented. In another implementation, the display of the pre-recorded video content may end at the direction of the first user 201. In another implementation, only a predetermined amount of the video question may be played. Accordingly, display of the pre-recorded video content may end after a predetermined amount of time has lapsed.

In some implementations, the change in visual emphasis from the live content to the pre-recorded content may be animated. For example, when the pre-recorded video content is introduced to the content window 365 of the communications application, the display of the live video content may be progressively reduced such that the display of the live video content appears to shrink.

Figure 5:
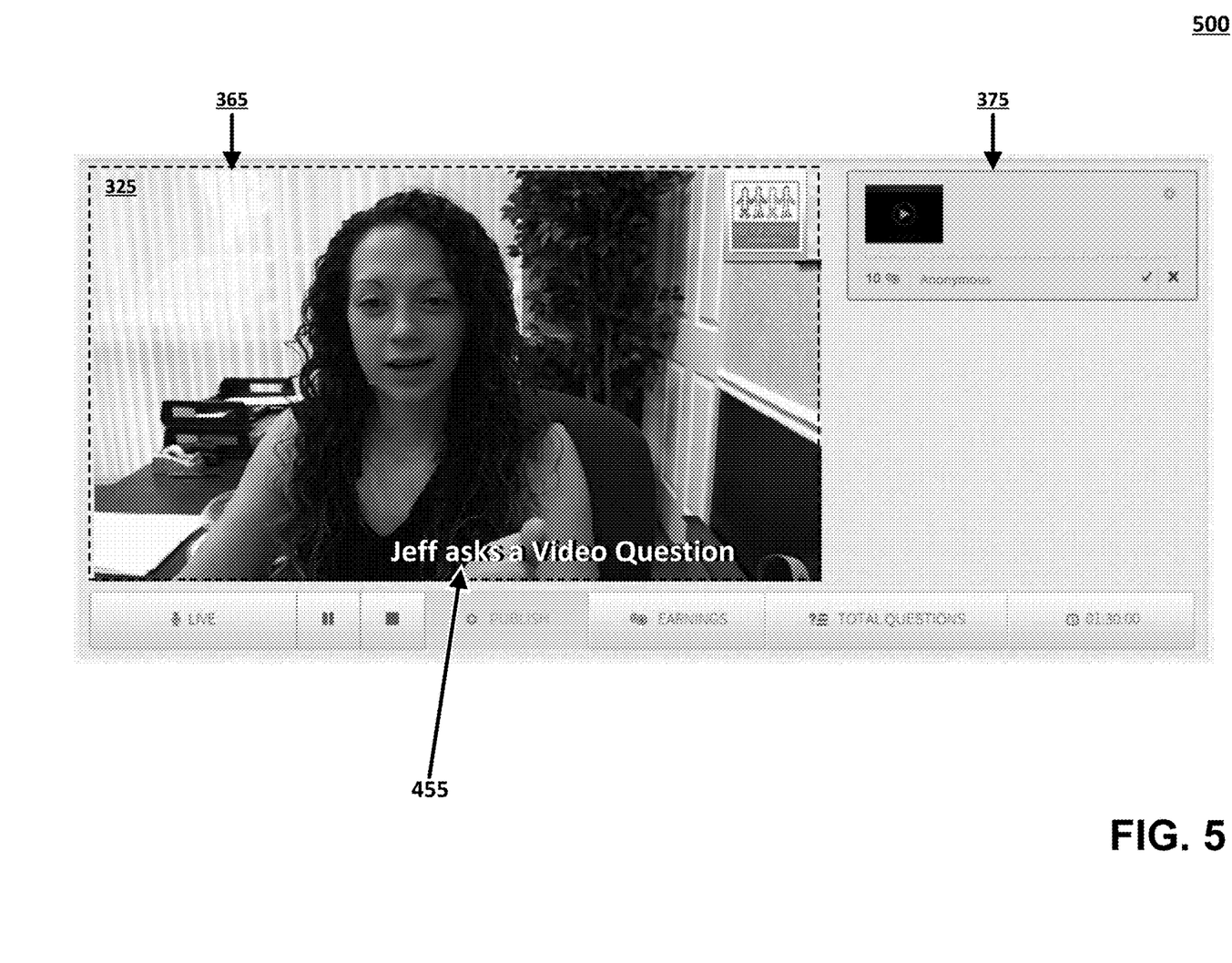
FIG. 5 depicts a display 500 of live video content 325 with a caption 455, according to an example implementation.

According to certain implementations, a caption 455 or other text may be associated with the pre-recorded video content 525. As shown in FIG. 4, an indication of the caption may be displayed along with the live video question. In some implementations, the text may be overlaid on the pre-recorded video content 525, for example, like a subtitle. In another implementation, the caption may be displayed at another location of the video communications application. As shown in FIG. 5, in some implementations, the caption 455 may continue to be displayed even after the associated pre-recorded video content is no longer being displayed. In some implementations, captions may also be associated with live video content 325.

In some implementations, the caption 455 may be received from a network device along with the corresponding video content 525. For example, the network device of an audience member may provide the pre-recorded video content and an associated caption to a server device 206. In another implementation, the caption may be determined by the server device. For example, the server device may assign a name to the content, or otherwise determine a suitable caption, for example, based on metadata associated with the content.

In some implementations, the caption 455 or other text may be a transcription or other indication of audio associated with the pre-recorded video content. For example, the caption may be a transcription of a question asked in the video by an audience member. In another example, a caption may indicate a property of the video or associated audio, for example, the name or artist of an actor or musician featured in the pre-recorded content.

In some implementations, the server device may combine the live video content 325, pre-recorded content 525, and captions 455 into a single video stream for distribution to the plurality of network devices, as described herein. In another implementation, the server device may distribute the caption to the plurality of network devices as data separate from the video stream, for example, as textual data.

Although the picture-in-picture effect has been described hereinabove, in exemplary fashion, with respect to superimposing two sources of video content; according to certain implementations, three, four, or an arbitrary number of video content sources may be packaged as a single video stream. In an example scenario, multiple persons in a group, for example, a plurality of band members, or the cast of a TV show, may wish to present to an audience together with each person at separate network devices. In some implementations, a respective picture-in-picture element may be used to portray each presenter while a video question or other audience content is being played. While a video question is not being played, visual emphasis may be placed on the currently speaking, or the last to have spoken, presenter.

According to certain implementations, the picture-in-picture effect may also be user controllable. For example, the first user or presenter may have the ability to select which video content source is visually emphasized in the output live video stream, before or during the broadcast of the live video stream. In some implementations, an indication of the user selection may be communicated to the server device, and the server device may accordingly arrange the video content frames in the output live video stream. In one implementation, a user selection may be expressed as a rule or preference. For example, a presenter may indicate that audience-submitted content should be emphasized when present.

In some implementations, the audience or plurality of other users may select content to emphasize or otherwise configure the relative placements of frames from the video content sources in the output live video stream. In one implementation, a user recording a video question or other pre-recorded content may pre-select an arrangement for the server device to execute when the video question is later played as part of the live video stream. In another implementation, the server device may immediately effect a change in arrangement of frames from the video content sources responsive to receiving instructions from an audience member.

Test Systems

An example system was created and tested for dynamically providing a picture-in-picture display incorporating live video content from a first network device, and pre-recorded content from a second network device, in a single stream. The example system included a server device configured to merge multiple video streams into a single video stream in real time, as described herein. The test server device utilized three video streams, two inputs and an output stream. The output stream was generated by multiplexing the two input streams. Custom multiplexor software was designed and implemented for execution on the server device. The frameserver software, Wowza, was used to stream the video content frame by frame When not performing the picture-in-picture effect, the multiplexer provided unaltered frames from the first input stream as the output. In addition, audio associated with the first input stream was directly passed through to the output stream. When performing the picture-in-picture effect, prior to the first frame from the second input stream being passed through to the output stream, the frame from the first input stream was reduced in size and added to the frame from the second stream at a predetermined location.

The output video stream with picture-in-picture effect enabled was successfully broadcast from the server device at a resolution of 720p with an average frame rate of 20 FPS.

Flow Diagrams

Figure 6:
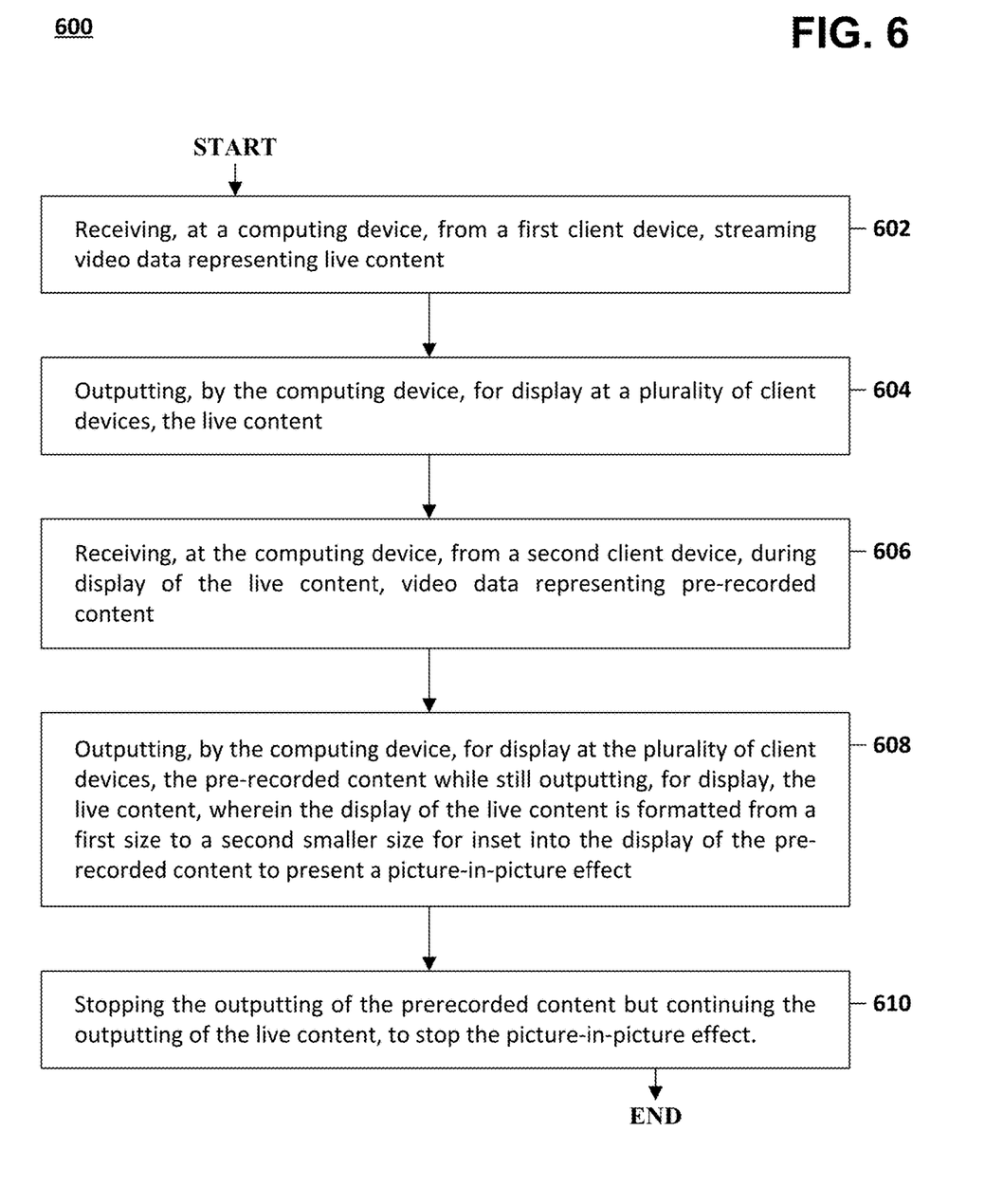
FIG. 6 depicts a flow diagram 600 of a method, according to an example implementation.

FIG. 6 depicts a flow diagram 600 of a method, according to an example implementation. As shown in FIG. 6, the method 600 starts in block 602, and, according to an example implementation, includes receiving, at a computing device, from a first network device, streaming video data representing live content. In block 604, the method 600 includes outputting, by the computing device, for display at a plurality of network devices, the live content. In block 606, the method 600 includes receiving, at the computing device, from a second network device, during the outputting of the live content, video data representing pre-recorded content. In block 608, the method 600 includes outputting, by the computing device, for display at the plurality of network devices, the pre-recorded content while still outputting, for display, the live content, wherein the display of the live content is formatted from a first size to a second smaller size for inset into the display of the pre-recorded content to present a picture-in-picture effect In block 610, the method 600 includes stopping the outputting of the pre-recorded content while continuing the outputting of the live content, to stop the picture-in-picture effect.

It will be understood that the various steps shown in FIG. 6 are illustrative only, and that steps may be removed, other steps may be used, or the order of steps may be modified.

Certain implementations of the disclosed technology are described above with reference to block and flow diagrams of systems, methods, or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:

receiving, at a computing device, over a computer network, from a first network device, streaming video data representing live content;

receiving, by the computing device, over the computer network, from the first network device, a user-selected configuration of a picture-in-picture effect for displaying live content in conjunction with pre-recorded content at a plurality of network devices;

outputting, by the computing device, over the computer network, for display at the plurality of network devices, the live content;

receiving, at the computing device, over the computer network, from a second network device, during the outputting of the live content, video data representing first pre-recorded content;

receiving, at the computing device, over the computer network, from a third network device, during the outputting of the live content, video data representing second pre-recorded content;

outputting, by the computing device and in conjunction with the live content, a queue comprising visual representations of the first and second pre-recorded content;

responsive to receiving, from the first network device, a selection of the first or second pre-recorded content, combining, by the computing device, based at least in part on the user-selected configuration, the selected pre-recorded content and the streaming video data representing live content into a single video stream, wherein the combining includes (i) formatting the live content from a first size to a second smaller size for insert into the picture-in-picture effect and (ii) placing the live content at a first location being fixed relative to a second location of the selected pre-recorded content in the single video stream;

removing, from the queue, the visual representation of the selected pre-recorded content;

outputting, by the computing device, over the computer network, for display at the plurality of network devices, the single video stream, the single video stream overriding the live content by stopping the streaming video data representing the live content;

stopping the outputting of the single video stream to stop the picture-in-picture effect; and outputting, by the computing device, over the computer network, for display at the plurality of network devices, the live content.

2. The method of claim 1, further comprising:

receiving, a caption associated with the pre-recorded content; and outputting, for display, the caption with the pre-recorded content.

3. The method of claim 2, wherein the caption is overlaid on the pre-recorded content during the outputting of the single video stream and overlaid on the live content after the stopping of the picture-in-picture effect.

4. The method of claim 2, further comprising receiving, at the computing device, textual data associated with the pre-recorded video content, wherein the caption is determined by the computing device based on the textual data.

5. The method of claim 2, further comprising determining, by the computing device, the caption based on analyzing audio data associated the pre-recorded video content.

6. The method of claim 2, further comprising determining, by the computing device, the caption based on metadata associated with the pre-recorded video content.

7. The method of claim 1, wherein the stopping the outputting of the single video stream is automatic responsive to a predetermined amount of time elapsing.

8. The method of claim 1, wherein the live content is overlaid on the pre-recorded content.

9. The method of claim 1, wherein the live content is inset in the pre-recorded content.

10. The method of claim 1, wherein the first network device is separate and distinct from the plurality of network devices.

11. The method of claim 1, wherein the user-selected configurations are received from the first network device before the live-content is output to the plurality of network devices.

12. The method of claim 1, wherein the user-selected configurations comprise a predetermined amount of time that pre-recorded content is allowed to be displayed.

13. The method of claim 1, wherein the user-selected configuration is a first user-selected configuration, the method further comprising:

responsive to receiving, at the computing device, over the computer network, from a particular network device of the plurality network devices, a second user-selected configuration of a picture-in-picture effect for displaying live content at the particular network device, formatting, based at least in part on the second user-selected configuration, the live content; and outputting, by the computing device, over the computer network, for display at the particular network device, the live content formatted based at least in part on the second user-selected configuration.

14. The method of claim 1, wherein the user-selected configuration is a first user-selected configuration, the method further comprising:

responsive to receiving, at the computing device, over the computer network, from the first network device of the plurality network devices, a second user-selected configuration of a picture-in-picture effect for displaying live content at the plurality of network devices, formatting, based at least in part on the second user-selected configuration, the live content; and outputting, by the computing device, over the computer network, for display at the plurality of network devices, the live content formatted based at least in part on the second user-selected configuration.

15. The method of claim 1, the method further comprising:

receiving, by the computing device, over the network from the second network device, during the outputting of the live content, text data that includes text to be presented with the pre-recorded content; and outputting, with the single video stream, a text stream including the text data.

* * * * *